United States Patent [19]

Hauser

[11] Patent Number: 5,522,242
[45] Date of Patent: Jun. 4, 1996

[54] WASHING MACHINE TRANSMISSION DRIVE CONNECTION

[75] Inventor: Hans Hauser, Strongsville, Ohio

[73] Assignee: MTD Products Inc, Cleveland, Ohio

[21] Appl. No.: 322,291

[22] Filed: Oct. 3, 1994

Related U.S. Application Data

[63] Continuation-in-part of Ser. No. 237,014, Apr. 29, 1994.

[51] Int. Cl.$^6$ .......................... D06F 37/30; F16H 19/04; F16D 3/10
[52] U.S. Cl. .................... 68/23.7; 74/32; 74/33; 192/12 BA; 464/160
[58] Field of Search .................... 74/32, 33, 77, 74/76, 78; 192/12 BA; 68/23.7; 464/160

[56] References Cited

U.S. PATENT DOCUMENTS

| | | |
|---|---|---|
| 431,124 | 7/1890 | Rae .................................... 464/160 X |
| 1,366,690 | 1/1921 | Berthold ................................ 74/324 |
| 1,432,954 | 10/1922 | Berthold ................................ 464/160 |
| 2,135,084 | 11/1938 | Kirby . |
| 2,161,618 | 3/1950 | Dunham . |
| 2,499,473 | 3/1950 | Elder . |
| 2,751,773 | 6/1956 | Woodson . |
| 2,844,225 | 7/1958 | Hubbard . |
| 2,946,409 | 7/1960 | Jennings . |
| 2,976,746 | 3/1961 | Flannery . |
| 3,046,772 | 7/1962 | Aberle . |
| 3,115,218 | 12/1963 | Waldrop . |
| 3,408,830 | 11/1968 | Suthruk et al. ................. 464/160 X |
| 3,575,057 | 4/1971 | Kurowski . |
| 3,779,090 | 12/1973 | Ostenberg . |
| 3,783,652 | 1/1974 | Archbold . |
| 3,838,755 | 10/1974 | Cochran . |
| 3,845,642 | 11/1974 | Cochran . |
| 3,899,933 | 8/1975 | Wright . |
| 4,255,952 | 3/1981 | Johnson . |
| 4,317,343 | 3/1982 | Gerry . |
| 4,444,027 | 4/1984 | Ikeda . |
| 4,803,855 | 2/1989 | Kennedy ............................. 68/23.7 |
| 5,033,278 | 7/1991 | Hossfield . |

Primary Examiner—Allan D. Herrmann
Attorney, Agent, or Firm—Lightbody & Lucas

[57] ABSTRACT

A transmission for a washing machine which uses an off center gear in combination with a rack and pinion agitation mechanism, a brake clutch, and a drive clutch to provide the agitation and the high speed spin of the washing machine. A lost motion interconnection between the machine's motor and the rack and pinion agitation mechanism allows a measure of relative rotation for actuation of the clutches without movement of the agitator.

16 Claims, 4 Drawing Sheets

Fig. 4A
CW
(AGITATE)

Fig. 4B
CCW

Fig. 4C
CCW
(SPIN)

WASHING MACHINE TRANSMISSION DRIVE CONNECTION

This application is a continuation-in-part application of U.S. Ser. No. 08/237,014 filed Apr. 29, 1994, Washing Machine Transmission, Hans Hauser, Inventor.

FIELD OF THE INVENTION

This invention relates to a drive connection for a transmission for washing machines and, more particularly in the preferred embodiment, top loading washing machines.

BACKGROUND OF THE INVENTION

Washing machines normally have a transmission located immediately adjacent the tub. Typically, these transmissions produce a back and forth agitating movement of an agitator for rotation of the washing machines motor in one direction, with a continuous direct spin of the tub being produced upon the rotation of the motor in an opposite direction. The transmission thus provides a dual state operation depending upon the direction of rotation of the motor for the machine. Typically, these transmissions are relatively large and heavy designs having cast iron housings and complicated interconnections between parts in order to provide for the agitation movement. The Franklin and Whirlpool units are typical of these designs.

An additional problem with the transmissions is that in at least one of them, the change in rotation of the motor to shift between the spin and agitate state of the transmission is also accompanied by a concomitant undesired inefficient movement of the agitator and/or tub. This movement is occasioned by the changeover mechanism engagement lag.

OBJECTS AND SUMMARY OF THE INVENTION

It is an object of the present invention to provide for a low cost transmission.

It is another object of the present invention to simplify the construction of rotary activated transmission status changeover mechanisms and accomplish this with a minimum number of parts.

It is yet another object of the present invention to lower the physical size of transmissions and status changeover mechanisms.

It is still another object of the present invention to reduce the complexity and weight of transmission changeover mechanisms.

It is a further object of the present invention to lower to cost and size of the associated washing machine transmissions.

Other objects and a more complete understanding of the invention may be had by referring to the drawings in which:

BRIEF DESCRIPTION OF THE DRAWINGS

The structure, operation, and advantages of the presently disclosed preferred embodiment of the invention will become apparent when consideration of the following description taken in conjunction with the accompanying drawings wherein.

DETAILED DESCRIPTION OF THE INVENTION

The drive connection of this invention is designed for use with a washing machine transmission. It is, therefore, appropriate to detail a washing machine transmission to establish the environment of the present invention, itself discussed primarily beginning on page 6.

Figure 6:
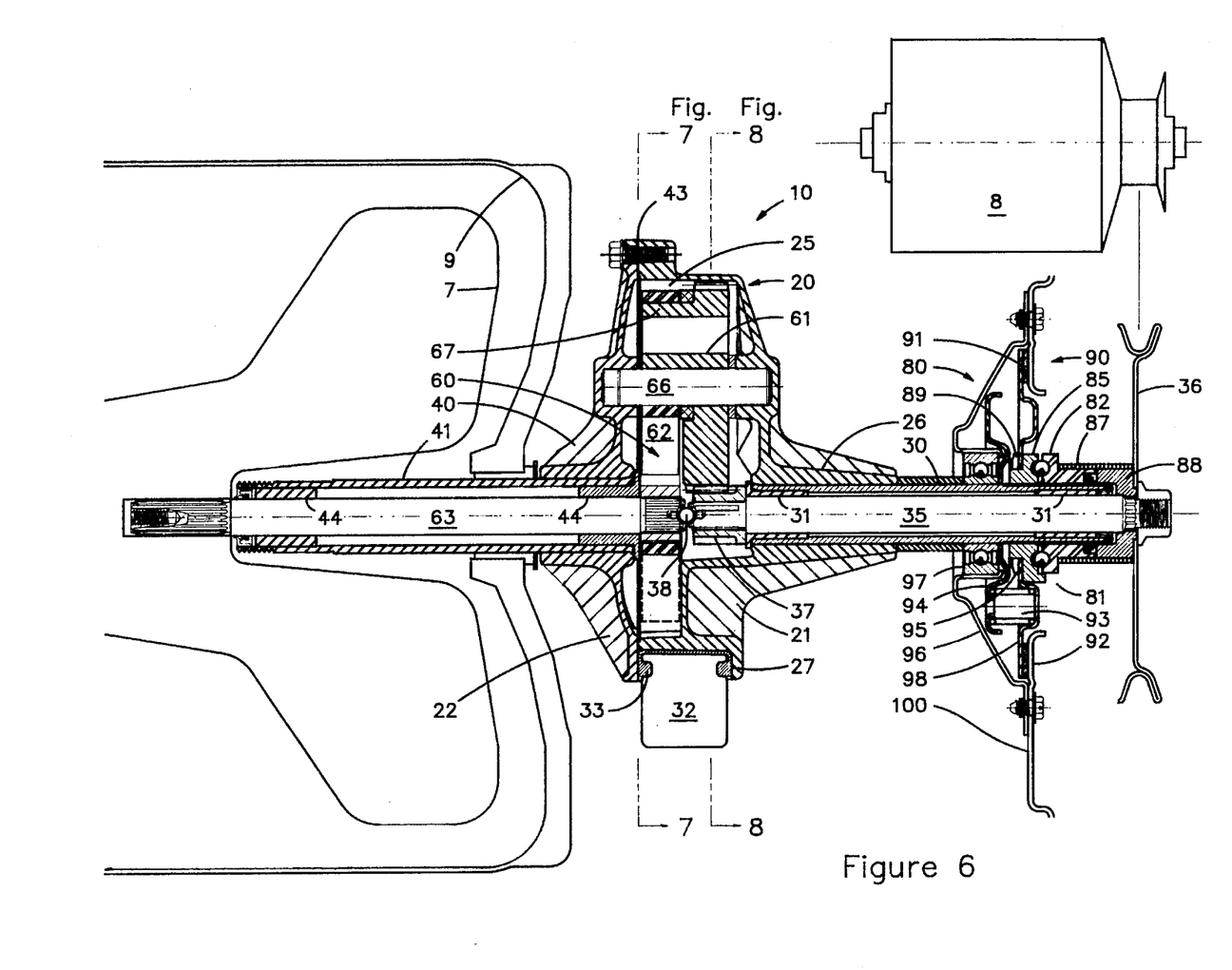
FIG. 6 is a longitudinal cross section view of the assembled transmission FIG. 5.

The washing machine includes a motor and a tub. These are found in representational form in FIG. 6 as items 7 and 9, respectively.

The motor 8 is capable of bidirectional rotation, the direction of rotation depending upon the allied washing machine control system in the customary manner. Upon rotation of this motor 8 in one direction, the transmission produces back and forth angular agitation of the agitator 7 with rotation of the motor 8 in the opposite direction causing spinning of the tub 9. This dual control action is produced by the transmission for the washing machine. Some motors also provide variable speeds in addition to directional control so as to vary the duty cycle. Again, this duty cycle is under the control of the allied washing machine control system. Due to the nature of the transmissions, it is not uncommon for the agitator 7 and/or tub 9 of the washing machine to physically move during the changeover between agitation and spinning especially with devices having rotary activated changeover mechanisms. This movement increases wear and stresses the transmission. It also confuses the consumer. The present invention is designed to eliminate this movement.

The transmission 10 includes a housing 20, an agitation system 60, and an activating system 80.

The housing 20 serves to contain the physical elements of the transmission. The preferred housing disclosed includes a lower housing 21 and an upper housing 22. The lower housing 21 is a deep drawn casting, preferably a low density material such as aluminum, having a cavity 25 sufficient to contain the physical parts of the transmission. The lower housing 21 in addition preferably includes an integral longitudinal extension 26 on the opposite side of the cavity 25 to provide an extended bearing support. The lower housing 21 also includes a sideways extending lateral cutout 27 for localizing the counterweight (later described). An input tube 30 fixedly connected or integral to the extension 26 provides an interconnection between the frame 100 of the washing machine, the housing 20 and later described clutch system 60. Two bearings 31 are included on the inside of the input tube 30 for rotatively supporting the later described input shaft 35.

A high mass counterweight 32 is located in the cutout 27 with rubber isolator 33 retaining the counterweight 32 in location. This counterweight 32 is designed to counter balance the otherwise uncompensated for parts of the housing 20 and agitation system 60 (for example the eccentric gear 61). Without this counterweight 32, a vast increase in size and complexity of design for the other parts of the transmission 10 would be necessary to provide for a smooth balanced spinning of the wash tub 9.

In the preferred embodiment disclosed, the lower casing 21 is also made of a low density material, aluminum, while the counterweight 32 is made of a higher density material, steel. This allows for a more effective use the mass of the counterweight 32 than would be possible with similar density materials. Also, the location of the center of mass of the counterweight 32 at a significant distance from the rotational axis of the transmission 10 further increases its effectiveness regarding lesser distances. In this respect, also note that in the preferred embodiment the center of mass of the counterweight 32 is located approximately 50% further outward from the rotational axis of the transmission than the center of mass of the furthest item out needing compensation (the gear 61 which has its center of mass substantially coextensive with the shaft 66). This further increases the effectiveness of the counterweight.

The input shaft 35 is rotatively mounted in respect to the lower housing 21 by the bearings 31. This input shaft 35 is axially in line with the later described agitator shaft 63. This simplifies and strengthens the support of the housing 20 to the frame of the washing machine as well as allied drive parts including the tub 9.

A ball 38 between the upper end of the input shaft 35 and the lower end of the agitator shaft 63 locates both such shafts axially in position as well as providing for a thrust bearing for the later described agitator. As the ball 38 rotates and spins during the operation of the device, wear is spread out evenly over the full outer surface of such ball 38.

A pulley 36 is located at the lower end of the input shaft 35 for supplying power between the motor 8 and the input shaft 35. The sizing of this pulley allows for a reduction in relative speed between the motor and the input shaft 35. An input pinion 37 is located at the other end of the input shaft 35 for drivingly connecting the input shaft 35 with the later described eccentric gear 61.

The invention of the present invention relates to a lost motion type interconnection between one drive member and another drive member (the pulley 36 and the pinion 37 in the embodiment shown) which interconnection allows for the operation of a rotary changeover mechanism while reducing movement of non-changeover parts (FIGS. 1–4). This lost motion interconnection allows a measure of relative rotation to a certain extent between the two drive members, which rotation allows the transmission mechanism to change its status, in the embodiment shown to shift over between agitation and spin, without unwanted secondary movement of either agitator or tub. The reason for this is that the lost motion interconnection selectively interrupts the drive connection to most non-changeover mechanism parts, thus allowing for a measure of relatively unloaded rotation, unloaded rotation that somehow operates the changeover mechanism. For example, in the embodiment shown the pulley 36 operates the changeover mechanism while the connected input shaft 35, input pinion 37, et al do not. These later parts further have driving engagements with further parts to the agitator 7. Allowing unfettered rotation of the pulley 36 for a limited extent without engagement of other non-utilized parts would therefore allow change of the condition of the transmission without the movement of unneeded parts. This lost motion interconnection is the nature of the invention although described in the following preferred embodiment.

In the preferred embodiment disclosed, this lost motion type interconnection 110 is provided between the top of the input shaft 35 and the main non-changeover mechanism drive connection, the input pinion 37. This is preferred in the embodiment disclosed due to the convenience of the location and simplicity of the design (i.e., minimal bearings, parts, etc. via alternative possibilities including between the pulley 36 and the input shaft 35). While this location between input shaft 35 and pinion 37 does allow rotation of the input shaft 35, it also allows use of the input shaft 35 to rotatively support the pulley 36 to the housing 20. Since pure rotation of the unloaded input shaft 35 by itself is relatively insignificant, it is included as an effective rotary changeover part. Other modifications including alteration in types of parts could also be made.

The preferred interconnection 110 includes splines 112 that extend outwardly from an otherwise smooth surface reduced diameter end 114 of the input shaft 35 in combination with mating splines 115 that extend inwardly from an otherwise smooth surface opening 117 in the center of the input pinion 37. The splines 112, 115 provide for both a lost motion interconnection between the input shaft 35 and pinion 37 as well as a sleeve bearing type support for the limited relative rotation therebetween. The interconnection is thus strong and reliable. A ring 120 and washer 121 cooperate with a groove 125 to retain the input pinion 37 on the end of the input shaft 35.

With this construction, the input shaft 35 can rotate in respect to the pinion 37 for a limited extent prior to driving interconnection, a limited extent preferably sufficient to allow transmission status changeover without unwanted movements of non-pertinent parts. Other types of lost motion interconnection could also be used.

In the embodiment disclosed, changeover is complete in about 40°. For this reason, the lost motion interconnection preferably allows at least this relative rotation before driving engagement between shaft 35 and pinion 37 and preferably a greater degree of rotation (70° shown).

The splines 112 of the input shaft 35 are three in number with a matching number of splines 115 for the pinion 37. The outer diameter of the splines 112 of the input shaft 35 substantially match the inside diameter of the opening 117 in the center of the input pinion 37 (diameter about ½") and the inside diameter of the splines 115 of the input pinion 37 substantially match the outer diameter of the smoothed surface end 114 of the input shaft 35 (diameter about ⁷⁄₁₆"). This provides for a solid full surface drive connection between splines 112–115 as well as a solid bearing rotational support between the input shaft 35 and input pinion 37. The circumferential width of the splines 112, 115 are about equal and selected to provide the desired 70° movement (both about 25°) as well as a sufficiently strong solid mechanical drive between the shaft 35 and pinion 37.

If desired, a resilient member such as rubber or plastic strips could be included between the splines 112, 115 so as to soften the impact therebetween upon the later described driving agitation connection. These strips would preferably be integrally connected at one end integrally to the same material washer 121 or by their edges to their respective spline so as to retain the resilient members in proper position. The width of the splines would preferably be adjusted to compensate for their effectively increased width.

In the preferred embodiment disclosed, a dampening member 116 is included in the lost motion interconnection 110. This dampening member is made of a dampening material such as plastic and includes a flat washer section 118 and axially extending legs 119.

The flat washer section 118 is located generally adjacent to the washer 121 within the input pinion 37. This washer section 118 serves to physically locate the axially extending legs 119.

The axially extending legs 119 are located on either side of one of the splines 112, 115 (112 shown). These legs 119 serve to dampen the mechanical drive connection between the splines 112, 115, thus reducing the impact forces therebetween. This reduces the noise and forces on initial engagement of the splines.

Differing types of dampening members 116 may also be utilized with the invention.

The operation of the lost motion connection will be later described beginning primarily on page 13.

The upper housing 22 completes the housing 20. The upper housing 22 consists of a low profile closure member 40 and an agitator tube 41. When the upper housing 22 is bolted to the lower housing 21 by bolts 42 with the seal 43 therebetween, the housing is complete. Two additional bearings 44 rotatively support the later described agitator shaft 63 in the agitator tube 41 of the upper housing 22. Again, the upper housing 22 is preferably made of a low density material such as aluminum so as to increase the effectiveness of the counterweight 32. As the agitation shaft 63 is in line with the input shaft 35, any inherent rotary imbalance is eliminated. The careful design techniques, for example the counterweight 32, further reduce any imbalance.

The agitation system 60 is the mechanism which alters the constant unidirectional rotation of the pulley 36 into a differing direction, a back and forth movement, of the cleansing agitator 7 in the tub 9, thus providing the necessary cleansing movement for the clothes therein. The preferred agitation system disclosed includes an eccentric gear 61, an agitator rack 62, and an agitator shaft 63.

The eccentric gear 61 is rotatively mounted to the housing 20 by an idler shaft 66 which is located extending between holes in the lower housing 21 and the upper housing 22. The eccentric gear 61 shown is directly rotated by the input pinion 37 which extends off of the end of the input shaft 35. The particular input pinion 37 eccentric gear 61 gear ratio has an approximate four to one reduction, a reduction significantly lower than customary in washing machine transmissions.

A bearing piece 67 extends off of one side of the eccentric gear 61. The center of this bearing piece 67 is displaced from the center of the eccentric gear 61. The side of the bearing piece 67 has a hole 69 through it and the rest of the axial depth of the eccentric gear 61 in order to reduce side to side imbalance forces during rotation (later described). A raised pie shaped section 68 off of the top of the eccentric gear 61 also aids in reducing this imbalance.

Figure 7:
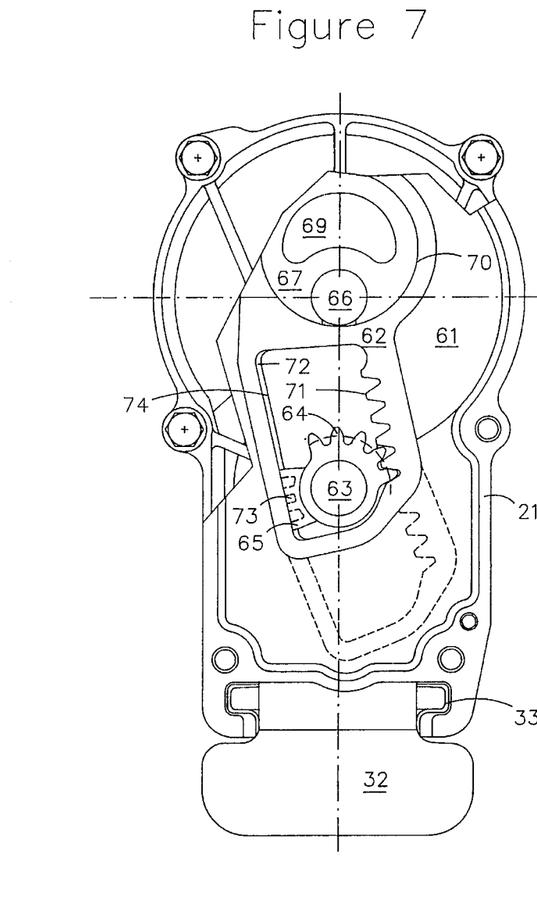
FIG. 7 is a lateral cross sectional view of the transmission taken substantially along lines 7—7 in FIG. 6; and, FIG. 8 is a second lateral cross sectional view of the transmission taken substantially along lines 8–8 in FIG. 6 without counterweight.
Figure 8:
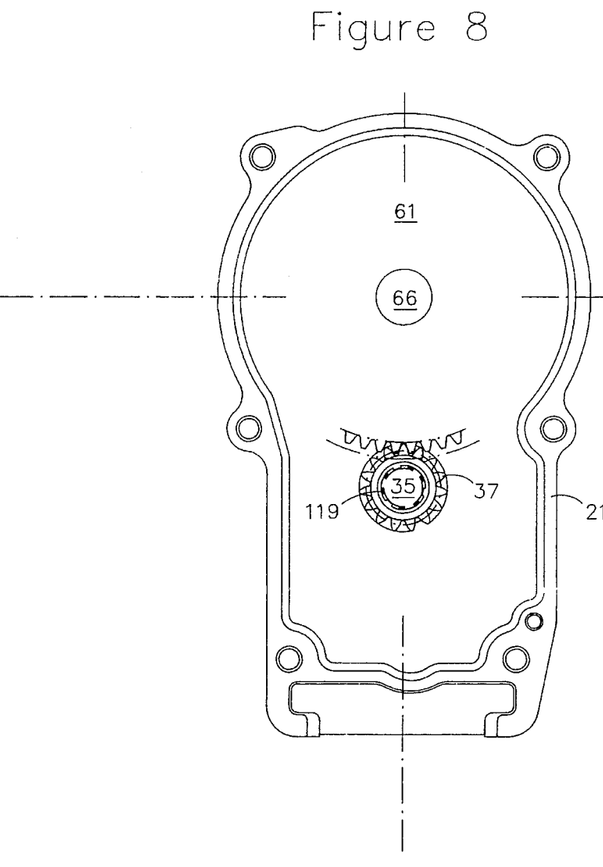

The agitator rack 62 has a circular bearing 70 and a cavity with teeth 71 (see FIG. 7). The circular bearing 70 of the agitator rack 62 is located around the bearing piece 67 of the eccentric gear 61 with the toothed head 64 of the agitator shaft 63 in driving contact with the teeth 71 of the rack 62. The cavity with teeth 71 is laterally offset in respect to the circular bearing 70. This reduces vibration by locating the longitudinal power transferring axis of the rack of teeth 71 in line with the central rotational axis of the circular bearing 70 (and shaft 66). This is preferred. A small bearing pad 65 extends between the non-toothed section of the head 64 of the agitator shaft 63 so as to bear on the flat surface 74 of the cavity in the rack 62 on the opposite side as the teeth 71. This bearing pad 65 has longitudinal slots (dotted lines 73 in FIG. 7) molded into the bottom thereof in order to provide for uniform wall thickness and thus improve cooling. The bearing pad further has a slight lip 75 formed extending off of the top thereof. This lip 75 cooperates with a small groove 72 formed in the top surface of the rack 62 to support the bearing pad 65 in position. Other means such as a groove in the toothed end of the agitator shaft with corresponding lip for the bearing piece 65, a washer above pinion 37, etc. could also be used to hold this bearing pad 65 in axial position.

The agitator shaft 63 itself is supported by bearings 44 to the agitator tube 41 of the housing 20. The longitudinal rotational axis of the agitator shaft 63 is in line with the longitudinal rotational axis of the input shaft 35. This allows the use of a simple ball thrust bearing ball 38 as well as simplifying the construction of the remainder of the washing machine.

During agitation, the housing 20 is fixedly connected to the frame of the washing machine (by the later described disc brake assembly 90). This first allows the input shaft 35 to rotate and then the input pinion 37 to rotate in respect to the housing 20 (due to the lost motion interconnection; importance later described). This in turn causes the eccentric gear 61 to rotate as long as rotation of the input shaft 35 is continued in the same direction. As the eccentric bearing piece 67 has a central rotational axis offset from that of the eccentric gear 61, any rotation of the eccentric gear 61 causes the agitator rack 62 to move back and forth with a reciprocating reversing movement for a limited longitudinal extent. As the teeth 71 of the rack 62 are in driving engagement with the toothed head 64 of the agitator shaft 63, this mechanism translates the pure rotation of the input shaft 35 into a back and forth limited reversing rotational movement of the agitator shaft 63 (about 150° in the embodiment shown). This transformation is facilitated by the use of the bearing pad 65 between the toothed head 64 and the flat surface 74 of the rack. The reason for this is that the bearing pad 65 spreads out the force from the toothed head 64 over a larger surface than otherwise possible (without the bearing pad 65, there would be direct linear contact between the toothed head 64 and the flat surface 74, thus concentrating the forces in a very small area). This increases wear and reduces durability of the transmission. The bearing pad 65 reduces friction and wear between the agitator rack 62 and the agitator shaft 63.

Figure 5:
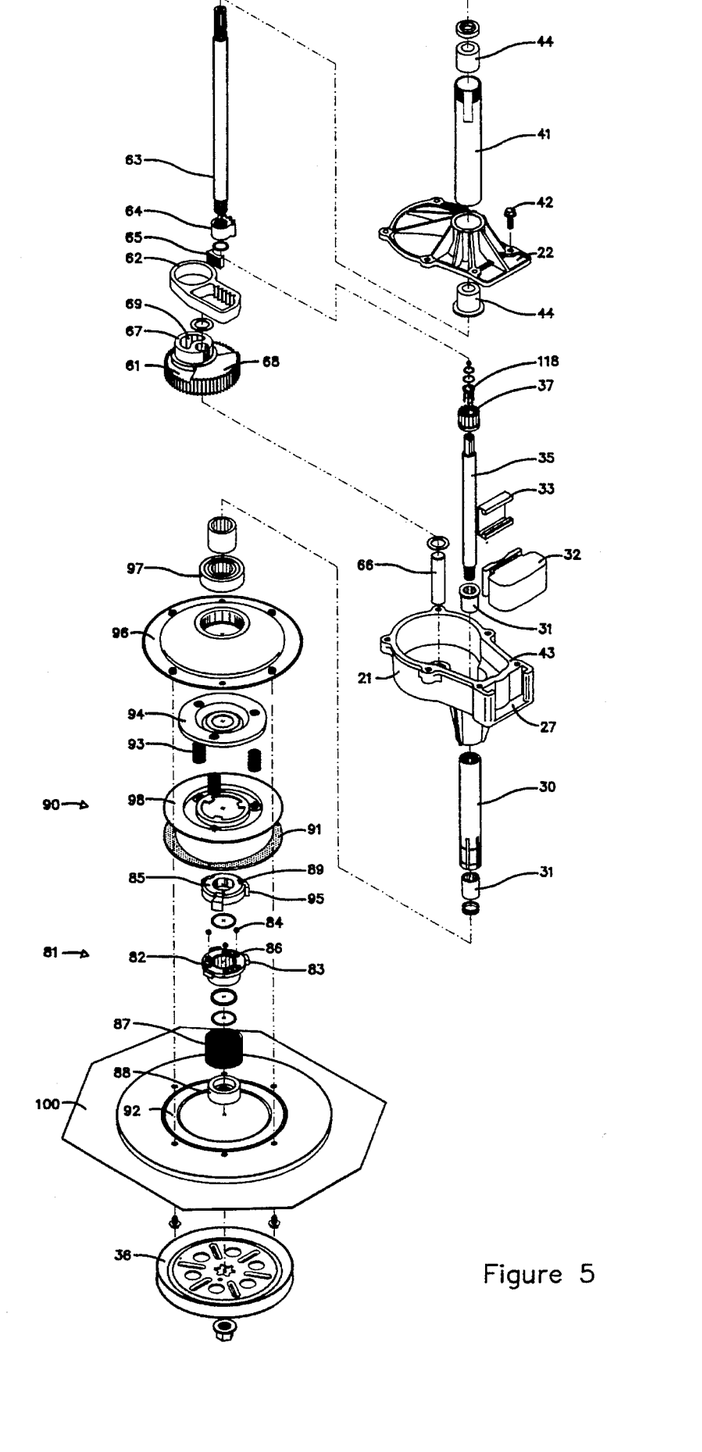
FIG. 5 is a perspective view of a disassembled transmission incorporating the invention of the application.

Due to the use of the preferred design, the amount of mass shifting in the transmission 10 is reduced relative to other systems. For example as can be seen in FIG. 5, most of the side to side shifting is caused by the bearing piece 67 of the eccentric gear 61 and the circular bearing 70 of the agitator rack. Due to the hole 69 in the bearing piece 67 and the narrow width of the circular bearing 70, the effective mass of both of these parts are minimized. This in combination with the high effectiveness of the mass of the counterweight 32 and the pie shaped raised section 68 of the eccentric gear 61 (as previously described) reduces off balance rotation. This is particularly so when one considers the effective mass of the damp clothes in the washing tub during any spin cycle. The designed in parameters thus lowers vibration relative to competitive designs.

The operative condition, agitation, or rotation of the transmission 10 is produced by an activating system 80. This activating system 80 includes a means of tying one drive member, the input pulley 36 shown, directly to another drive member, the housing 20 shown, so as to transfer 100% of the rotation of the pulley 36 to such housing 20. This causes spinning of the drum 9. A means to interconnect one drive member, the housing 20, to the fixed relatively immovable position frame 100 of the washing machine is also included so as to lock the housing 20 into position in respect thereto. This activates agitation by providing a reaction lock for the agitation system. As later described, the selective operation of one or the other of these means produces the two operative conditions for the transmission 10. As the changeover between the two conditions is not instantaneous, the lost motion interconnection between the two drive members, the input shaft 35 and pinion 37, reduces or eliminates undesired part movement.

In the unpowered condition of the transmission 10, the default condition is the fixing of the housing 20 to the frame 100 of the washing machine by the later described brake assembly 90. (This condition is produced by the force of three springs 93 acting downwardly on a brake disc 91 so as to engage it with a brake surface 92 of the frame 100.) This operative condition of the transmission 10 remains in effect on rotation of the pulley 36 into an agitation direction. At this time, the brake assembly 90 provides a reaction member for the agitation. (Note that the splines 115–112 may or may not be in driving connection for agitation. [FIG. 4A] at the initial rotation of the pulley 36 in an agitation direction; they could be in neutral [FIG. 4B], or even spin [FIG. 4C] condition. Therefore, there could be up to 70° free rotation of the pulley 36 before the pinion 37 is drivingly engaged to the pulley 36. This lost motion, however, does not change the disc engaged condition of the transmission itself: It merely delays the beginning of the agitation.)

On rotation of the pulley 36 in a spin direction, the brake assembly 90 is eventually released and the housing 20 tied to the pulley 36 for common rotation. This operative condition of the transmission 10 remains in effect on continuation of rotation of the pulley 36 in a spin direction, reverting to a default condition on cessation of such rotation. The invention of this application facilitates this operation by allowing free rotation between the input pulley 36 relative to the agitator (due to the lost motion interconnection to the input pinion 37), a free rotation that allows release of the brake assembly 90 without agitator movement (as later described).

In the embodiment disclosed in FIG. 5, the two conditions are provided by an inclined ramp clutch assembly 81 and a large disc brake 90. The particular clutch assembly 81 disclosed provides for the rotation connection as well as deactivating the disc brake. It thus is part of both means.

The inclined ramp clutch assembly 81 includes an actuation member 82, a reaction member 85, a pulley hub 88, and a clutch spring 87.

The pulley hub 88 is fixedly connected to the input pulley 36 for rotation therewith in either direction. This pulley hub 88 has, at its outer circumference, a unidirectional spiral wound clutch spring 87 surrounding it. This clutch spring 87 is spiral wound so as to allow free rotation of the pulley hub 88 in one direction of rotation while locking the pulley hub 88 to the actuation member 82 for rotation therewith on rotation in the other direction. Due to the nature of this clutch (as others), some relative rotation is necessary before engagement.

The actuation member 82 includes on its upper surface three inclined ramp pockets 86. The reaction member 85 is located immediately above the actuation member 82 with an internal sleeve bearing to the tube of the lower housing 21. Three pockets (not shown) mirror image to those in the agitation member 82 are formed in the lower surface of the reaction member 85. Note that it is preferred that both these ramp pockets have a reduced (or even flat) incline at their shallowest ends. The reason for this is while the initial spin torque might be high (50 pounds for example), the continuing spin torque can be a fraction of this (ten pounds for example). As in the preferred embodiment disclosed, there is a substantially 180 pound spring force from the disc brake springs 93, the use of the reduction in incline is utilized to maintain the brake in deactivated condition even during a severe torque drop as long as the pulley 36 continues to be rotated by the motor in a spin direction. In addition, the reduction in incline also aids when there are torque load variations at a given level (unbalanced loads for example).

Figure 1:
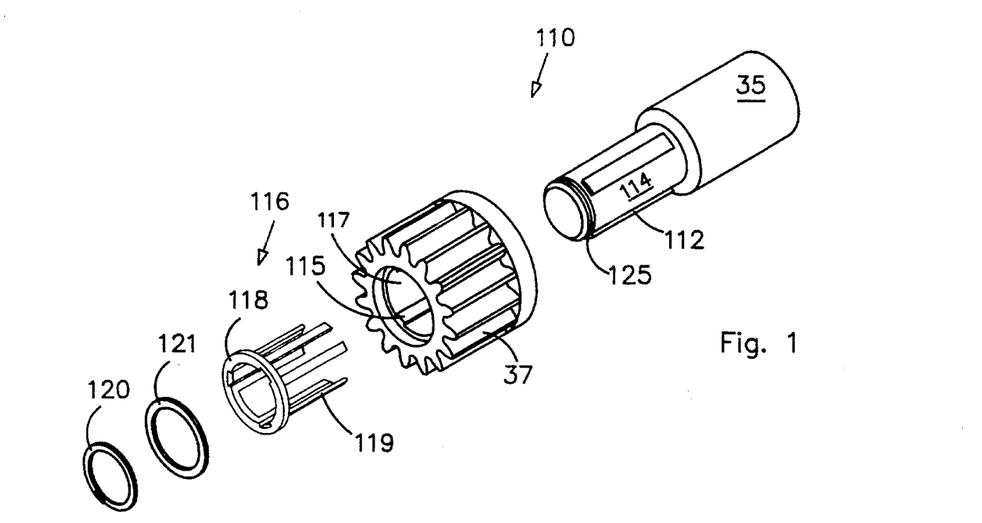
FIG. 1 is an unassembled perspective view of a drive connection incorporating the invention of the application.
Figure 2:
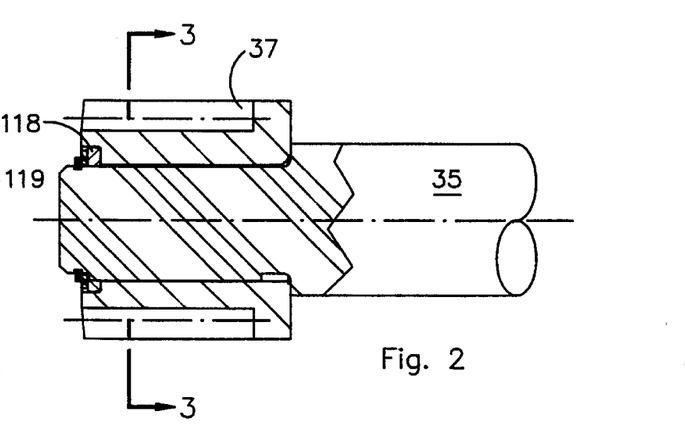
FIG. 2 is a cutaway longitudinal side view of the drive connection of FIG. 1.
Figure 3:
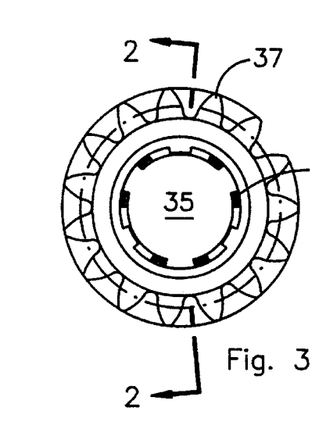
FIG. 3 is a lateral cross section of the drive connection of FIG. 2.
Figure 4A:
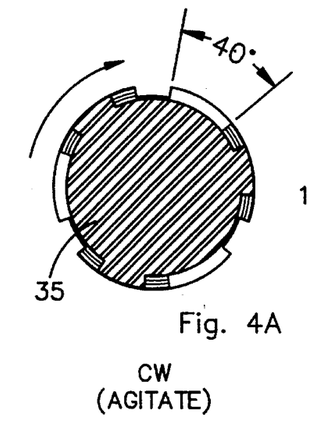
FIGS. 4A–4C are partial end views of the drive connection of FIG. 2 in agitate, neutral, and spin drive conditions.
Figure 4B:
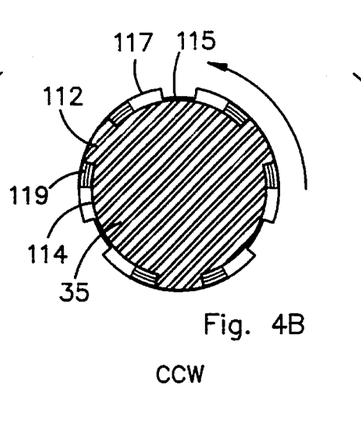
Figure 4C:
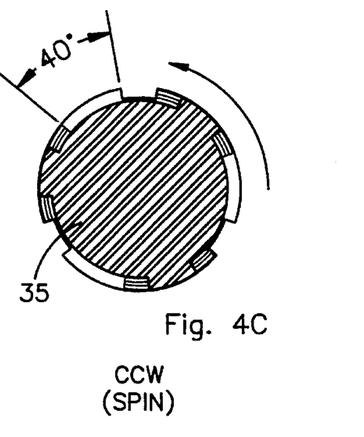

Three actuation balls 84 are captured between the ramp of the actuation member 82 and the pockets of the reaction member 85. These balls 84 act to separate the actuation member 82 from the reaction member 85 on the relative rotation therebetween. Note that since these ramps extend circumferentially, some degree of relative rotary motion between the actuation 82 and reaction 85 member is necessary prior to the full release of the brake assembly 90; in the preferred embodiment disclosed, substantially 40° of relative rotation. The invention of this present application allows an unloaded relative rotation between the input shaft 35 and input pinion 37 of at least this amount, thus causing the only substantive loading of the motor 8 on condition changeover to be the torque necessary to separate the reaction member 85 from the actuation member 82 (against springs 93): Neither the agitator 7 nor tub 9 is engaged at this time. Thus the invention allows rotary actuation of a changeover mechanism while reducing the number of other parts not necessary for changeover. This facilitates the changeover while eliminating consumer confusion. Note that this operation is aided by the fact that normally spin follows agitation. Therefore, customarily the input shaft 35 and input pinion 37 will be in or near the agitation drive position (FIG. 4A) prior to the motor reversal. This would allow a full 70° of rotation prior to opposite lock engagement (FIG. 4C). In addition, in the embodiment disclosed, only 40° is necessary to fully release the brake assembly 90, with functional release occurring even before this. Therefore, even an intermediate position (such a FIG. 4B) still would produce most of the advantages of the present invention.

There are a set of overlapping tabs 95, 83 respectively extending off of the edges of the reaction member 85 and actuation member 82 respectively. These two tabs 95, 83 are designed to solidly drivingly interconnect the actuation member 82 to the reaction member 85 at or slightly before the balls 84 contact the shallow end between such members and at or before the splines 112 of the input shaft 35 drivingly engaging the splines 115 of the input pinion 37.

With this orientation, relative rotation between the actuation member 82 and reaction member 85 in one direction moves the reaction member 85 first upwards (via the spring 87 and the balls 84 against the springs 93) and then ties the reaction member 85 to the actuation member 82 (via the tabs 95–83) for rotation therewith. As the reaction member 85 is in turn solidly connected to the housing 20 (via its toothed inner surface to the lower end of the tube 30 of the lower housing), this rotation of the reaction member 85 also serves to tie the pulley 36 to the housing 20 and tub 9 for common rotation (i.e., spin cycle). Simultaneously or subsequently, the splines 112–115 engage to spin the agitator as well.

The disc brake 91 is deactivated by the upwards movement of the reaction member 85. The reason for this is the reaction member 85 is fixedly interconnected to the disc 91 of the disc brake assembly for common upwards movement, accomplishing this by the top of the toothed outer surface 89 pushing against member 98. Thus the brake is deactivated as the actuation member 92 rotates in respect to the reaction member 85. Due to the lost motion interconnection between the pulley 36 and input pinion 37, this deactivation occurs before rotation of the agitator 7.

As rotation of the operative actuation member 82 is provided by the clutch spring 87 interconnection to the pulley hub 88 caused by rotation of the pulley 36 in one direction, the operative condition of the inclined ramp clutch assembly 81 is thus dependent on the direction of rotation of the motor 8.

The activation of the disc brake 91 serves as the means to cause agitation to occur. This will occur if the motor 8 revolves in an agitation direction. The reason for this is the operation of the disc brake assembly 90. The invention of this application allows time for this operation, The disc brake assembly 90 disclosed includes a brake disc 91, a brake ring 92, a spring 93, and a reaction member 94.

The brake disc 91 itself is a flat circular member having a brake surface at its outer lower edge. The inside opening of this brake disc 91 is, as previously discussed, interengaged with the toothed outer surface of the reaction member 85 (through part 98) so as to lock the brake disc 91 to tie such disc 91 to such member 85 for rotation and upward motion therewith. A support member 94 extends between the lower part of the housing 20 to a location adjacent to the upper surface of the brake disc 91 to bias same into braking condition with the frame via the springs 93 between the brake disc 91 and the support member 94. These springs 93 serve to bias the brake disc 91 into an actuated or braked position against the brake ring 92 (180 pounds spring force in the disclosed embodiment). The brake ring 92 is itself fixedly connected to the stationary frame 100 of the washing machine.

As the brake disc 91 is fixedly connected to the housing 20 for rotation therewith in its spring loaded default condition, this serves to lock the washing machine tub (via a disc 91) into a default braked condition preventing the rotation thereof. This activates the agitation mechanism of the transmission.

The inside of the brake disc 91 is positioned next to the upper surface of the reaction member 85 such that upward movement of this reaction member 85 causes the brake disc 91 to move upwards against the force of the spring 93 and thus release the brake. In the embodiment shown, the disc brake assembly 90 is located adjacent to the main lower bearing support 96, a fixed part of the washing machine frame, immediately adjacent to the main lower bearing 97.

The ramp assembly 86 and brake assembly 90 are activated by the direction of rotation of the input shaft 35.

Upon rotation of the input shaft 35 and the pulley hub 36 in one direction, the clutch spring 87 is not activated and the actuation balls 84 are located and remain at the lower ends of their ramps in the actuation member 82 and their reaction member 85. This allows the disc brake 91 to continue to contact the brake ring 92, thus holding the lower housing 21 in a position of non-rotation. This provides a reaction member for the previously described agitation system. When the splines 112 of the input shaft 35 contact the splines 115 of the input pinion 37, agitation will occur.

On rotation of the input shaft 35 and the pulley hub 36 in the opposite direction, the clutch spring 87 is activated tying the actuation member 82 to the pulley hub 36 for common rotation. This in turn forces the actuation balls 84 to be moved to the high ends of their respective ramps in the actuation member 82 and the reaction member 85. This causes the reaction member 85 to move in an upwards direction. As the brake disc 91 is located immediately adjacent to the upper surface 95 of the reaction member 85, this movement also forces the disc brake 91 upwards against the force of the springs 93 to move away from the brake ring 92. This releases the brake. The lost motion interconnection between the input pulley 36 and the input pinion 37 provides rotational freedom for this to occur without other parts being partially involved (for example the agitator). When the tabs 83, 95 subsequently contact, the tabs serve to tie the actuation member 82 to the reaction member 85 for rotation therewith. This in turn ties the input shaft 35 to the housing 20 for rotation therewith causing spinning of the tub. The splines 112–115 interconnection will cause spinning rotation of the agitator. Therefore, as long as the pulley 36 (and the shaft 35) continue to rotate in a single direction, the tub 9 continues to rotate with the shaft. This continues spinning of the tub 9.

On cessation of rotation of the input shaft 35, the activation mechanism reverts to its default braked condition. This is facilitated by the inertial qualities of the rapidly spinning tub 9 which causes the reaction member 85 to move faster than the actuation member 82, forcing the balls 84 downwards to the low ends of their ramps thus reactivating the brake 90. The incline of the respective pockets facilitates this return to braking condition. The inertial qualities also tend to bias the input shaft 35 in its agitation position (FIG. 4A) in respect to the input pinion 37.

Upon resetting of the brake to its default condition, rotation of the shaft in the first direction will cause agitation of 7, with reverse rotation again spinning the tub 9 through the lost motion interconnection as described.

Modification of this agitation/spin activation system are possible. For example, the two operative conditions are provided by a relative clutch and a relative brake with the activation occurring depending on the direction of rotation of the pulley 36 in one direction activating the clutch with rotation in a second direction actuating the brake. Other means of accomplishing this could be provided. In addition, the invention may be utilized with other types of rotary activated condition changeover mechanisms to reduce down stream loading by non-changeover related parts.

Therefore, although the invention has been described in its preferred embodiment with a certain degree of particularity, it is to be understood that numerous changes can be made without deviating from the invention as hereinafter claimed.

What is claimed:

1. In a washing machine transmission having a status changeover mechanism controlled by the direction of rotation of a first reversible rotation drive member and a mechanism driven by a second drive member in one of the directions of rotation, an improvement comprising a lost motion interconnection means between the first drive member and the second drive member, said lost motion interconnection means allowing a measure of relative rotation between the first drive member and the second drive member.

2. The washing machine of claim 1 wherein an input shaft is drivingly located between the first drive member and the second drive member and characterized in that said lost motion interconnection means utilizes the input shaft therebetween.

3. The washing machine of claim 2 characterized in that said lost motion interconnection means utilizes an input pinion as the second drive member.

4. The washing machine of claim 3 wherein said input pinion surrounds the input shaft and characterized in that said lost motion interconnection means utilizes splines on the surface of the input shaft and splines on the surface of the input pinion.

5. An improved washing machine transmission drive for a machine having a tub and an agitator, said transmission drive comprising an input pulley, motor means to rotate said input pulley, an input shaft, means to connect said input pulley to said input shaft, means for said input pulley to rotate the tub, an input pinion, means for said input pinion to agitate the agitator, most motion interconnection means to connect said input shaft to said input pinion allowing a measure of relative rotation therebetween, a status changeover means driven by the input pulley, said status changeover means providing either spinning of the tub or agitation of the agitator, and housing means to support said input pulley, input shaft, input pinion, and said status changeover means.

6. The drive of claim 5 wherein said input pinion surrounds the input shaft and characterized in that said lost motion interconnection means utilizes splines on the surface of the input shaft and splines on the surface of the input pinion.

7. The drive of claim 5 characterized in that said input shaft has two ends with said input pulley being connected to one end and said input pinion being connected to the other end.

8. The drive of claim 5 characterized in that said status changeover means includes a spiral wound wire clutch.

9. The drive of claim 5 characterized in that said housing means includes a housing, said status changeover means requiring a measure of rotation between said input pulley and said housing, the measure of relative rotation of said lost motion interconnection means being greater than the measure of rotation of said status changeover means.

10. The device of claim 6 characterized in that said splines of said input shaft are located on the outer surface thereof and said splines of said input pinion are located on the inner surface thereof.

11. An improved transmission drive for a washing machine having a bidirectional motor, a frame, and a tub, the drive comprising a housing, an input shaft, said input shaft having an axis and an end with an outer surface, said outer surface including splines, said input shaft being rotatively mounted to said housing, an input pinion, said input pinion having a center opening have an inner surface, said inner surface including splines means to rotatively mount said input pinion to said end of said input shaft with said splines of said pinion circumferentially spaced from said splines of said input shaft so as to provide a measure of relative rotation between said input shaft and said input pinion, a clutch, means for said clutch to drivingly connect the motor to the housing on rotation of the motor in one direction so as to spin the tub, a brake, means for said brake to interconnect said housing to the frame of the washing machine, and means to release said brake on rotation of the motor in said one direction during spinning of the tub, means to interconnect the motor to said input shaft on rotation of the motor in the other direction so as to agitate the agitator, an agitator shaft, said agitator shaft having an axis and an end, and said agitator shaft being rotatively mounted to said housing, agitation means to connect said end in driving contact with said input pinion so as to provide back and forth agitation of said agitator shaft upon rotation of said input shaft relative to said housing.

12. The drive of claim 11 characterized in that said agitation means includes an eccentric gear, said eccentric gear having rotary axis and an eccentric bearing piece with a center, said eccentric gear being rotatively mounted to said housing with said center of said eccentric bearing piece being displaced from said rotary axis of said eccentric gear, an agitator rack, said agitator rack having a bearing piece and a rack, and said bearing piece of said agitator rack being connected to said eccentric bearing piece of said eccentric gear.

13. The drive of claim 11 characterized in that said clutch is a spirally wound clutch spring, and said means for said clutch to drivingly connect the motor to the housing includes a pulley hub, said pulley hub being connected to said input shaft, means to drivingly connect said pulley hub to the motor, an actuation member, said actuation member being connected to said housing, and said spirally wound clutch spring surrounding said pulley hub and said actuation member.

14. The drive of claim 13 characterized in that said brake is a disc brake, and said means to release said brake includes said clutch.

15. The drive of claim 14 characterized in that said means to release said brake further includes a reaction member, and means for said reaction member and said actuation member to release said disc brake.

16. An improved transmission drive for a washing machine having a bidirectional motor, a frame, and a tub, the drive comprising a housing, means to fixedly connect the tub to said housing, an input shaft, said input shaft having an axis, said input shaft being rotatively mounted to said housing, an eccentric gear, said eccentric gear having rotary axis and an eccentric bearing piece with a center, said eccentric gear being rotatively mounted to said housing with said center of said eccentric bearing piece being displaced from said rotary axis of said eccentric gear, an input pinion, said input pinion having an outer surface and a splined open center, said input pinion surrounding said input shaft, said input shaft having a splined outer surface, lost motion interconnection means to connect said splined open center of said input pinion to said splined outer surface of said input shaft so as to allow a measure of relative rotation therebetween, means to drivingly connect said outer surface of said input pinion to said eccentric gear, an agitator rack, said agitator rack having a bearing piece and a rack, said bearing piece of said agitator rack being connected to said eccentric bearing piece of said eccentric gear, an agitator shaft, said agitator shaft having an axis and a toothed end, said agitator shaft being rotatively mounted to said housing with said axis being in line with said axis of said input shaft and with said toothed end in driving contact with said rack of said agitator rack so as to provide back and forth agitation of said agitator shaft upon rotation of said input shaft relative to said housing, a clutch, means for said clutch to drivingly connect the motor to the housing on rotation of the motor in one direction so as to spin the tub, a brake, means for said brake to interconnect said housing to the frame of the washing machine, and means to release said brake on rotation of the motor in said one direction during spinning of the tub, means to interconnect the motor to said input shaft on rotation of the motor in the other direction so as to agitate the agitator.

* * * * *